(12) United States Patent
Grabsch

(10) Patent No.: US 6,783,195 B1
(45) Date of Patent: Aug. 31, 2004

(54) METHOD AND DEVICE FOR CONTROLLING UNITS IN A VEHICLE ACCORDING TO THE LEVEL OF NOISE

(75) Inventor: Hans-Peter Grabsch, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 33 days.

(21) Appl. No.: 10/048,421
(22) PCT Filed: Jul. 8, 2000
(86) PCT No.: PCT/DE00/02236
§ 371 (c)(1),
(2), (4) Date: Jun. 26, 2002
(87) PCT Pub. No.: WO01/08928
PCT Pub. Date: Feb. 8, 2001

(30) Foreign Application Priority Data

Jul. 29, 1999 (DE) .......................... 199 35 375

(51) Int. Cl.[7] ................................................. A61F 2/20
(52) U.S. Cl. ...................... 303/191; 381/71.1; 381/71.4
(58) Field of Search .............................. 381/71.4, 71.7, 381/86, 94, 71; 303/113.1, 191

(56) References Cited

U.S. PATENT DOCUMENTS

| | | | | |
|---|---|---|---|---|
| 5,108,159 A | * | 4/1992 | Tsang et al. ................. | 303/191 |
| 5,170,433 A | * | 12/1992 | Elliott et al. ................. | 381/7.1 |
| 5,203,178 A | * | 4/1993 | Shyu .......................... | 381/71.7 |
| 5,325,437 A | * | 6/1994 | Doi et al. ..................... | 381/71 |
| 5,455,779 A | * | 10/1995 | Sato et al. .................... | 381/71 |
| 5,748,748 A | * | 5/1998 | Fischer et al. ............. | 381/71.4 |
| 6,343,127 B1 | * | 1/2002 | Billoud ...................... | 381/71.4 |

FOREIGN PATENT DOCUMENTS

| | | |
|---|---|---|
| DE | 44 29 373 | 2/1996 |
| DE | 195 48 248 | 6/1997 |
| DE | 196 33 188 | 7/1997 |
| DE | 199 08 992 | 9/2000 |
| FR | 2 692 709 | 12/1993 |
| JP | 5-96929 | 4/1993 |

OTHER PUBLICATIONS

SAAB 9–3 Jan. 28, 1998.*
Patent Abstracts of Japan, vol. 017, No. 439 (M–1462), Aug. 13, 1993.
E. Zwicker, "Psychoacoustics," (published by Springer–Verlag) (1982).
E. Zwicker, "Electroacoustics," (published by Springer–Verlag) (1984).

* cited by examiner

Primary Examiner—Matthew C. Graham
(74) Attorney, Agent, or Firm—Kenyon & Kenyon

(57) ABSTRACT

A method and a device as well as a control unit for controlling at least one aggregate in a vehicle, the noise caused by the aggregate and/or at least one variable representing this noise being ascertained. In this connection, the passenger compartment noises in the vehicle are ascertained, or at least one variable representing these is ascertained. The noise caused by the aggregate and/or the variable representing this is correlated with the passenger compartment noises and/or the variable representing these. Finally, as a function of that, the control or a control signal for the aggregate is generated and/or adapted.

13 Claims, 6 Drawing Sheets

METHOD AND DEVICE FOR CONTROLLING UNITS IN A VEHICLE ACCORDING TO THE LEVEL OF NOISE

BACKGROUND INFORMATION

The present invention relates to a method and device for controlling aggregates in a vehicle according to the definition of the species in the independent claims.

The number of aggregates built into vehicles is growing steadily. These aggregates emit noises which, in certain operating situations, are perceived as being disturbing and a nuisance by the passengers in the vehicle. In order to tone down these disturbing and irritating noises, the aggregates are controlled by complex methods for the purpose of reducing the noise.

To do this, in DE 195 48 248 A1 a method and a device for controlling the pump of an electrohydraulic braking system is proposed. In this instance, hydraulic fluid from a pressure accumulator is applied through valves into the wheel brake cylinder, the pressure accumulator being loaded using a pump. The pump is controlled in a performance-regulated manner in such a way that charging the pressure accumulator by the pump is accomplished with as little noise as possible. This is achieved by a pulse/pause ratio specifiable according to demand, especially in view of resonance effects and/or pressure in the pressure accumulator. For this, the pump is operated at a minimally required power depending upon the situation, in order to avoid the development of loud noise.

DE 44 29 373 A1 shows the control of a further aggregate in a vehicle, an electromagnetic valve, in particular a braking system, which is also carried out under the requirement of minimizing the noises that occur. This is achieved in that, during the usual changeover from a first to a second switching position, in particular in the flow-through direction, in a first phase, the current for operating the valve falls off for a predefined time, according to a certain function, from a first to a third current value, and in a second phase it remains approximately constant, the third current value lying above a second current value, which is used to achieve the second switching position. Here too, a complex method of limiting the development of noise is shown.

A control serving the same purpose, that is noise reduction, is shown in DE 199 08 992 A1. In this document, in a generator system as the aggregate for an internal combustion engine, noise development of the generator is reduced by lowering the excitation current under certain circumstances. Lowering the excitation current is done with the aid of a control element which ascertains the conditions for lowering the current from supplied or stored data, and gives out corresponding control signals. In this connection, a role is played by the generator temperature and the structure-borne noise recorded by means of a sensor. Here too, a very costly method is used to keep the generator's noise emission low.

It has been shown that the cited related art is not able to obtain optimal results in every respect. Thus, in spite of costly control methods, a loss of portions of the possible operating range of aggregates contained in the vehicle is created because of the noise reduction measures. And so, a certain loss of performance, caused by the compromise between the minimum required control, from a technical functioning point of view, and the maximum desired control from a noise technology point of view cannot be avoided in the related art.

On the other hand, noises caused by the control of the aggregates are not perceived as disturbing in some situations, or rather they are not noticeable because of other noises. But this effect is not considered by the related art in the control of the aggregates. And yet, the temporal and spectral overriding effects causing this are sufficiently known in psychoacoustics, and have been well researched. As examples for this, the technical books from Springer-Verlag (publishers), "Psychoacoustics" (1982) and "Electroacousticst"(1984) by E. Zwicker are named. The cited overriding effects are also described in those books.

SUMMARY OF THE INVENTION

Consequently, the object is set of expediently letting noises created by the controlling of the aggregates, which the passengers of the vehicle cannot deliberately influence, or which have a great potential of being disturbing, occur when they are overridden by passenger compartment noises of the vehicle, so as not to disturb the passengers. The passenger compartment noises can likewise proportionally include environmental noises, travel noises and/or operating noises of individual aggregates, other noises like conversation, caused by the passengers, as well as devices installed in the passenger compartment, such as fans, audio systems or audio components, computers, etc.

The device according to the present invention, as well as the control unit and method for controlling at least one aggregate in a vehicle, in response to which passenger compartment noises appear, have the advantage that, by using them, the aggregate is controlled as a function of the occurring passenger compartment noises and/or of at least one variable representing the passenger compartment noises, that a reduction in the scope of the actually possible function can frequently be avoided without having to do without comfort with respect to noise perception.

That means that expediently in noise ranges or the appropriate operating ranges in which noise development of the individual aggregates in the vehicle can be overridden or masked by the already present, generally desirable passenger compartment noises, the aggregates can be operated in full functional and performance scope, without thereby perceptible, additional noise development being created. If the aggregate noise at full function and performance cannot be overriden, then, if possible, function and performance can be reduced optimally with respect to noise.

Thereby, advantageously, the aggregate or aggregates is/are controlled as a function of the correlation between the noise caused by the aggregate and/or at least one variable representing it and the passenger compartment noises and/or at least one variable representing this, that is, a control signal is generated as a function of it, or adapted.

Expediently, the correlation is designed as a comparison of the various noises or the variables representing them, as the case may be. For this, advantageously overriding effects of the passenger compartment noises or of the variables representing them are then used.

In this connection, in order to be able to use expediently all overriding effects, spectral and/or temporal data on the noise caused by the aggregate and on the passenger compartment noises are ascertained, and these are then advantageously correlated. One can thereby use, for example, post-overriding and/or simultaneous overriding and/or possibly also pre-overriding by the passenger compartment noises as an effect.

Advantageously, the passenger compartment noises and the noises caused by the aggregate or the aggregates, as the case may be, are represented by a sound variable such as, for instance sound pressure and/or loudness. Consideration of spectral and/or temporal data succeeds here in each case by the expedient use of a sound variable level or by using a psychoacoustic variable, such as specific loudness level plotted against time and/or frequency.

Besides that, reduction in disturbing noises or noise components contributes advantageously to riding safety, in addition to riding comfort, because distraction by disturbing noises can at least be diminished, if not totally eliminated.

It is of further advantage, also perhaps for reasons of cost pressure or rising performance requirements, that noise-wise non-optimized aggregates and their controls can be operated inconspicuously with respect to noise.

Still more advantages may be noted from the features of the claims and the specification.

BRIEF DESCRIPTION OF THE DRAWING

The invention is subsequently explained in greater detail with reference to the Figures shown in the drawings.

DESCRIPTION OF THE EXEMPLARY EMBODIMENTS

Figure 1:
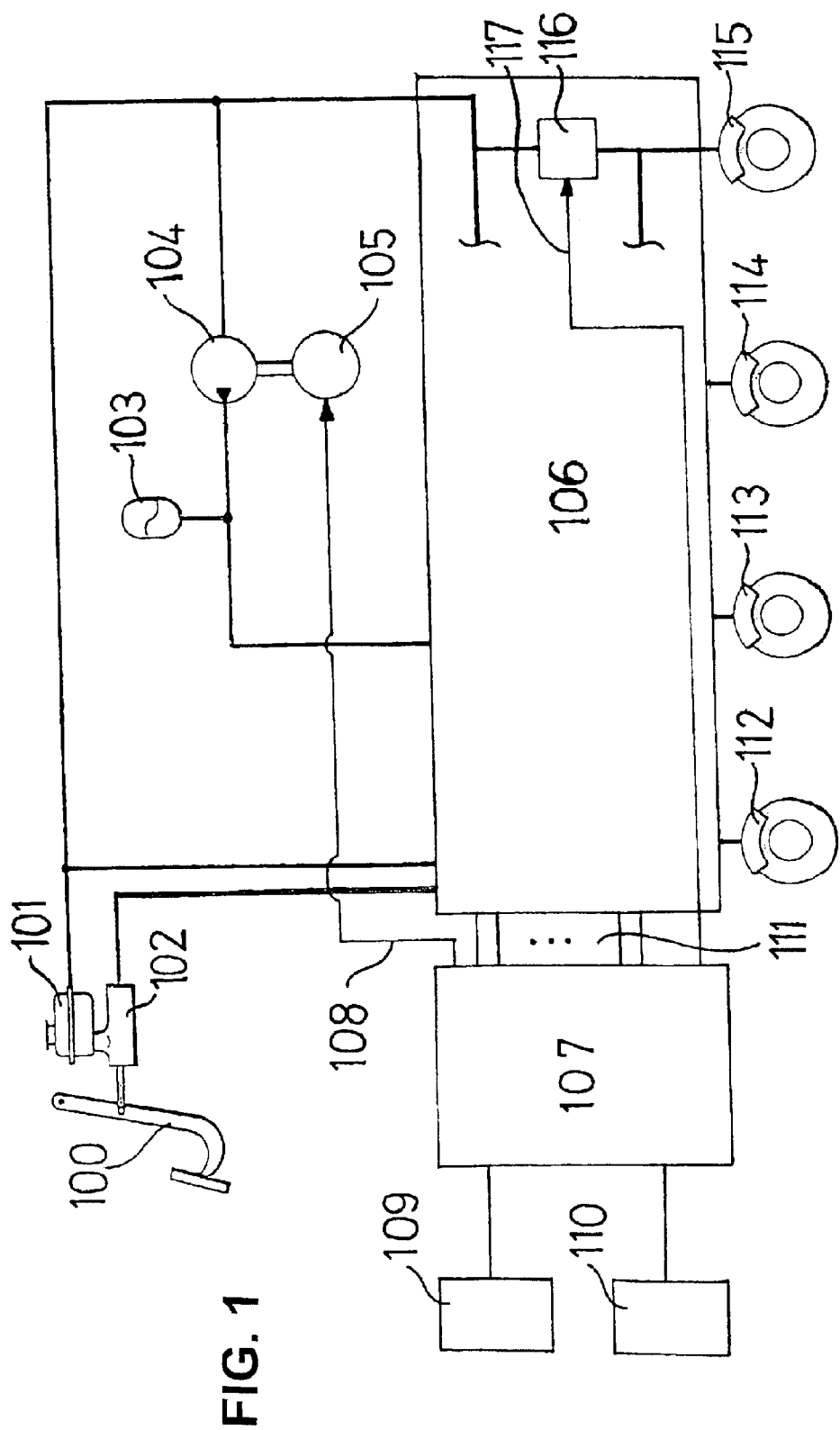
FIG. 1 shows a braking system of the general kind, in which various aggregates are controlled.

FIG. 1 shows a braking system, especially an electrohydraulic braking system, in which the brake fluid is applied from an hydraulic accumulator 103 via valves 116 into wheel braking cylinders 112 through 115. The hydraulic accumulator is charged using a means for propelling the pressure mediun, in the form of a pump 104. If possible, this charging should take place without perceptible noise development.

In the braking system shown, a brake pedal 100 is illustrated which is connected to a master brake cylinder 102. By the application of the brake pedal, pressure can be built up in master brake cylinder 102. Master brake cylinder 102 is in contact with a reservoir 101. From master brake cylinder 102 as well as reservoir 101 lines for the pressure medium lead to braking system 106. Braking system 106 includes valve means and possible pressure sensing, as well as, in the case of an electrohydraulic braking system, a possible pedal travel simulator and other components known from the related art, depending on the specific embodiment of the braking system. In one line between reservoir 101 and braking system 106, the means for conveying the pressure medium is represented in the form of pump 104. A driving mechanism for operating the pump, for example in the form of an electric motor is shown as 105. Thus, in this exemplary embodiment, an aggregate is generated by pump 104 and pump motor 105. Between pump 104 and braking system 106 a hydraulic accumulator 103 is installed. As an example, 116 represents a valve means in the braking system, here between reservoir 101 and wheel braking cylinder 115.

Further valve means of braking system 106 have been omitted for reasons of clarity. Braking system 106 is connected to wheel braking cylinders 112 through 115 via pressure medium lines. Controlling or regulating the controllable or regulatable components of the braking system, especially the motor/pump unit, is represented by control unit 107. The connections leading away from, or to control unit 107, having the corresponding actuator technology and/or sensor technology are shown schematically in bundle of lines 111. Only control lines 108 for pump motor 105, and line 117 of valve 116 as a further unit are taken out of this bundle. Further sensor technology external to the braking system is shown as 109. Element 110 represents further possible control units which are in contact with control unit 107 of the braking system. Control unit 110 can, for example, also be provided as an additional unit for control as a function of noise. However, the method according to the present invention can also come to an end in control unit 107, it being possible for a passenger compartment sensor technology for noise detection, for example, to be contained in sensor technology 109. Thus, for example, variables such as vehicle speed and/or engine speed and/or environmental noises and/or operating noises of aggregates and/or passenger compartment noises are recorded by sensor technology 109. However, comparable data can also be polled by other control units 110 and transmitted to control unit 107 of the braking system. As a function of the variables or noises, respectively, thus recorded, the aggregates of the braking system can now be controlled. To select examples, as mentioned before, pump 104 with appertaining pump motor 105, controlled via line 108, as well as valve means 116, shown as an example, regulated via line 117.

In this connection, pump motor 105 is controlled in a timed manner. The pulse/pause ratio PPV, on which the timing of pump 104 or rather pump motor 105 is based, can be varied here as a function of the passenger compartment noise and the operating noise of the aggregates or the variables representing these noises, such as sound variables (sound pressure, sound intensity, etc); here, these are correlated with one another. Control of the valve can also be performed as a function of this. Principally, such valves are under consideration as are controlled, but do not immediately result in an undesired braking pressure increase or decrease in the driving operation, or all valves of the braking system are a possibility if a braking pressure change in the form of an increase or a decrease is desired. When using linear valves, for example, that is, valves which do not have an open and a closed setting, but in which, for example, any desired opening cross section, and thus any desired flow-through quantity of pressure medium can be predefined by pulsed or timed control, the control can be performed analogously to the control of the pump.

Figure 2:
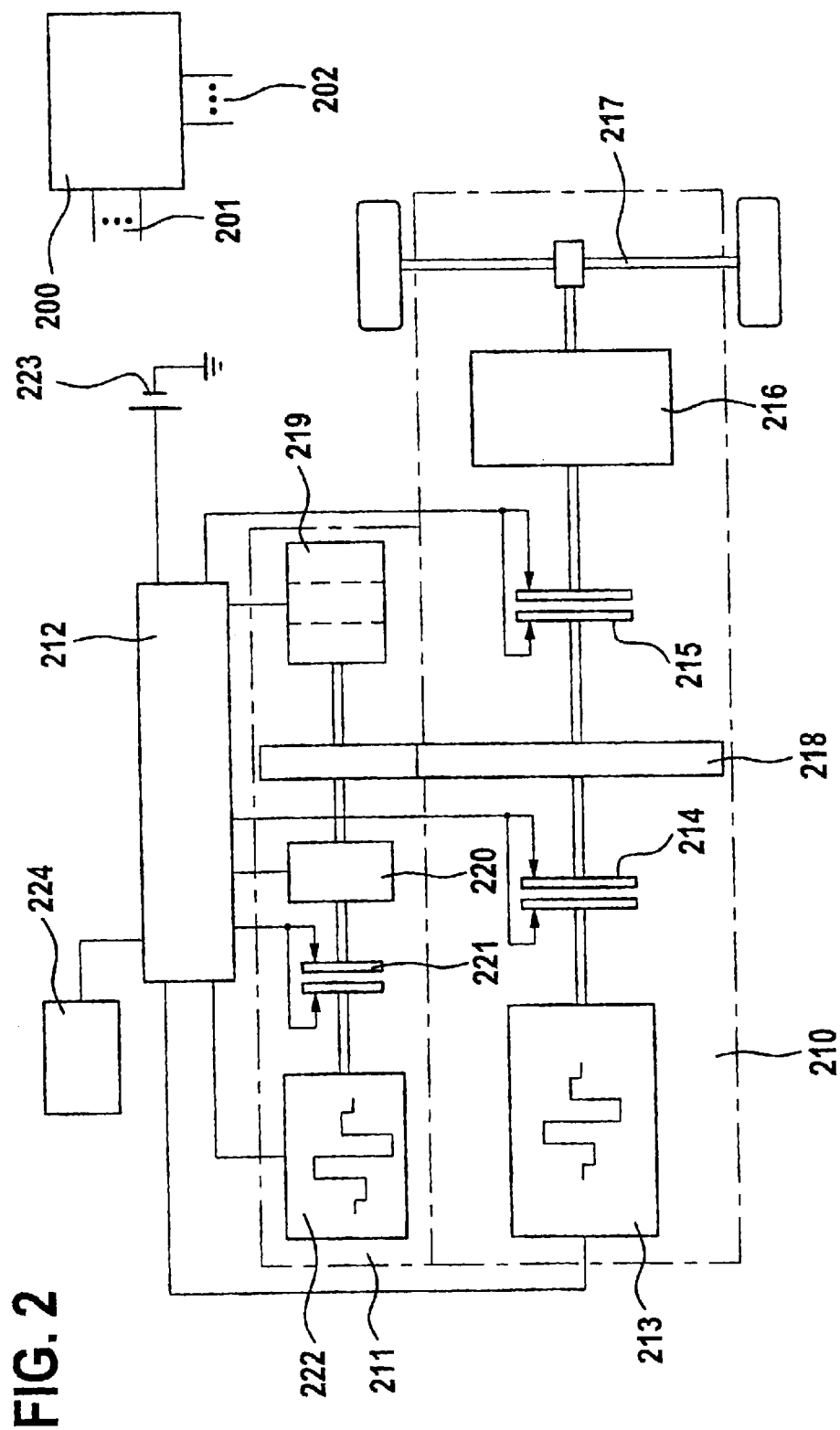
FIG. 2, starting from a drive system, describes a plurality of aggregates connected with it but separately controlled.

In FIG. 2, a drive system for motor vehicles can be recognized, which is made up of a main drive train 210 and an auxiliary drive train 211, as well as a common electrical control and supply 212 in the vehicle electrical system of the motor vehicle. The main drive train includes an internal combustion engine 213 as the main drive, an auxiliary coupling 214 at the output of internal combustion engine 213, a drive coupling 215 and a postconnected vehicle transmission 216 whose output shaft is firmly connected to a drive axle 217 of the motor vehicle. Between drive coupling 215 and auxiliary coupling 214 in main drive train 210 there is an intermediate transmission 218 which connects main drive train 210 with auxiliary drive train 211. In auxiliary drive train 211 there are several auxiliary aggregates 219 to be driven, such as a cooling water pump, an oil pump for lubricating circulation of the motor vehicle, a pump for power steering, as well as a compressor for an air conditioning system which works while the vehicle is stopped and perhaps when the main drive is turned off. In auxiliary drive train 211 there is also an aggregate in the form of a starter-generator 220 firmly connected to intermediate drive 218, to which an auxiliary aggregate drive 222 is coupled via a clutch 221. A further internal combustion engine here functions as auxiliary aggregate drive 222, whose power output is, for example, less than half that of internal combustion engine 213 in main drive train 210. Electrical control and supply 212, via electrical lines, is connected, among other things, to auxiliary coupling 214, drive coupling 215, clutch 221, starter-generator 220 and at least partially to auxiliary aggregates 219. It is also connected to internal combustion engine 213 and auxiliary aggregate drive 222 for temperature sensing. Furthermore, at electrical control and supply 212 in the vehicle electrical system of the motor vehicle, a storage battery 223 for electrical storage is connected, as well as further sensor technology 224, such as a remote control, a gas pedal sensor or a switching contact in the driver's door of the motor vehicle or passenger compartment sensor technology as well as optional aggregate noise sensor technology. Optionally, a passenger compartment element such as an audio aggregate or a communications device or a travel guidance system could be provided as 200, which already has its own passenger compartment sensor technology. However, unit 200 could also represent an additional control unit, which automatically receives sensor signals, among other things, via output lines 201 and input lines 202, and controls individual aggregates or several aggregates in combination as a function of noise, that is, as a function of passenger compartment and aggregate noise or variables representing them.

In the following, the operating manner of the drive system according to the present invention is now described in greater detail. By controlling the three couplings 214, 215 and 221, mentioned above, intermediate drive 218 can be uncoupled completely from auxiliary drive train 211 by opening drive coupling 215 and auxiliary coupling 214 of internal combustion engine 213 as main drive, on the one hand, and from drive axle 217 on the other hand. Thereby, and by the above mentioned couplings, the aggregates can be controlled automatically or in any desired combination. Thus, via auxiliary aggregate drive 222 and via starter-generator 220 when clutch 221 is closed, current can not only be generated, but mechanical output can be produced at auxiliary aggregates 219. Thereby is achieved a flexible and optimal-use supply for electrical and other users.

Many of these aggregates shown in FIGS. 1 and 2 give off undesired noises, but they do not have to be operated constantly. Above all, the aggregates do not have to be steadily operated in a condition unfavorable for the sense of hearing or perception. As shown, the aggregates can be controlled as desired, even in combination or singly. However, if one considers safety-relevant controls at a higher priority, special noises which the driver or the vehicle occupants cannot deliberately influence, or which have a great potential for being disturbing, can be controlled in such a way that they preferably occur when they are-overridden or masked by the passenger compartment noises in the vehicle, or that their function or power is controlled in such a way that the aggregate noises are just about overridden or masked, so that the passengers are not disturbed, and thereby no loss of safety ensues. On the other hand, reduction in disturbing noises or noise components contributes to riding safety, in addition to riding comfort, because distraction by disturbing noises can at least be diminished, if not totally eliminated.

Furthermore, depending on the design of the vehicles, the above-named components and/or assemblies and/or engines present in them are denoted generally as aggregates.

Figure 3:
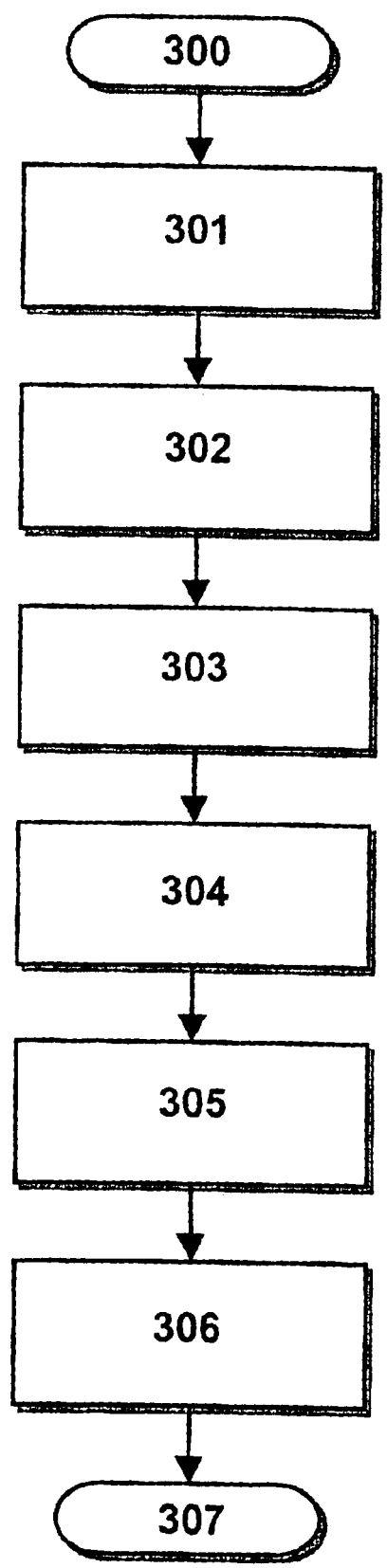
In FIG. 3, in the form of a flow diagram, the general method according to the present invention, for controlling at least one aggregate is represented. With regard to this, FIG. 4, consisting of FIGS. 4a and 4b, shows schematically a representation of the overriding of aggregate noises.

FIG. 3 shows generally a method for controlling at least one aggregate in the vehicle. As mentioned before, the basis for noise-dependent aggregate control is the stipulation that such aggregate noises, which the driver or the vehicle passengers cannot deliberately influence and/or which have a high potential for disturbance, should expediently occur when they are overridden by passenger compartment noise of the vehicle and/or are controlled in their function and/or power in such a way that the aggregate noises are just about overridden, so as not to disturb the vehicle passengers. For this purpose, the start of the general method takes place in block 300. In block 301 there follows the ascertainment of the passenger compartment noise or noises and/or the ascertainment of the auxiliary variables from which may be derived passenger compartment or aggregate noise characteristic values by using previous knowledge (e.g. database, knowledge base in expert systems), as they can later be generated in block 303 and used in block 304. For this, on the one hand, existing systems can be used, such as sensor technology 109 or 224, respectively, that is, for example, a microphone, handsfree equipment of a communications device or other sensor technology already present in the vehicle, such as the microphone of a vehicle PC or one integrated into a high-end audio system in the vehicle. On the other hand, such a sensor technology, for example, in the form of microphones or structure-borne noise sensors, can be purposefully retrofitted, e.g. by vibration or resonance. Likewise, in block 301 the noises of the aggregates or the noise of at least one aggregate can be recorded with the aid of a sensor. For this, for example, either a microphone or structure-borne noise sensor technology can be used. According to a specific embodiment, yet to be explained, of the introduced method, in block 301 aggregate noise as well as passenger compartment noise are either both recorded by sensor technology or in each case one is ascertained, the other being recorded by a sensor, or both noises are merely ascertained without a sensor being present. The use of the concept aggregate noise may mean, either the noise brought about by a aggregate with or without appertaining resonance effects due to structure-borne transmission or the various noises of several aggregates, or it may mean the summation of noises of many or of all the aggregates. But the noise can also be represented by a variable representing it, such as a sound variable or an air density variable (e.g. air density fluctuations) or, for example, by loudness. The cause for the previously named summation of noises stems from the use of a sensor for recording the noises of several aggregates. After the detection or ascertainment of the noises, these are processed further in block 302. This happens, for example, during analog noise recording by an analog/digital conversion carried out in block 302. A further working up of the signals, recorded in 301, in 302 can consist in the fact that inaudible ranges of the detected or ascertained noises are already being masked, whereupon they play no role in the further procedure.

In the following block 303, the signals containing the noise data are worked up with the aid of psychoacoustic signal analysis for the spectral and/or temporal overriding or masking, respectively. In this connection, on the one hand, overriding spectra are formed or ascertained, and on the other hand, the time of occurrence of the aggregate noise(s)

with respect to the passenger compartment noises is set. Thus, in particular, pre-auditory thresholds and/or concurrently auditory thresholds and/or post-auditory thresholds can be ascertained, whereby additionally to the simultaneous overriding, that is, the simultaneous occurrence of disturbing and useful sound, an analysis with respect to post-overriding and perhaps also pre-overriding (e.g. With noises whose time of appearance and/or frequency is already known beforehand, if only a very short time beforehand) can be made. For this purpose, in particular the specific loudnesses are used.

In subsequent block 304 the signals thus worked up are compared to one another. Depending on the specific embodiment to be explained below, the passenger compartment noise thus worked up, or the signal or variable describing it, is, for instance, compared to a database with respect to noise development in the aggregates to be controlled. Besides that, data necessary for the comparison, such as the spectra of aggregates, can also be ascertained from the database, if only auxiliary variables are available.

Starting from this comparison, the control of each aggregate is determined by a decision algorithm. For this, additional data can be used which contain information as to whether the aggregate is already switched on or not, or how it is being controlled at the moment, respectively, such as by reading in an up-to-date pulse/pause ratio PPV in a pump control, for example.

Based on the decision algorithm in block 305, in block 306 the control of the aggregate is then generated or adapted. For example, at a high passenger compartment noise level or the appropriate overriding, an aggregate can already be switched on in the preliminary stages or rather, operated at higher power, without this being perceived by the vehicle passengers as being disturbing. Such an aggregate can be, for instance, the storage pump in a braking system by which the accumulator is filled with the pressure medium. It can also be a fuel pump, or the additional internal combustion engine in FIG. 2, just as it can be the remaining aggregates already mentioned. For the control itself, for example, a starting pulse, a switch-off signal, or even a special pulse/pause ratio or a desired performance can be predefined. Following block 306, the end of the method is reached in block 307.

The running time from the start of the method in block 300 to the end in block 307 is predefinable, for example. In that predefinition, polling times for the signals, computing and processing times in the system can play a role. On the one hand, the method can steadily run or be operated concurrently in the background, or it can be switched in only when aggregates or an aggregate are/is to be controlled. It is also conceivable that the passsengers might switch the method in or out.

As has already been indicated, various specific embodiments of the method are possible. In the first case, only the passenger compartment noise is recorded with the aid of sensor technology. Noise data of individual aggregates are available from previous experiments and/or simulations, that is, as a laboratory database. This database can be ascertained especially by road experiments and sensor recording of the noises emitted by the aggregates. That is how the overriding spectra of the passenger compartment noises are generated in block 303. Likewise, the temporal analysis is optimally carried out. That is done in this case by using the already mentioned additional information as to whether and how the aggregate is being controlled. Thus, a data comparison of passenger compartment noise and the noise database of the at least one aggregate can be carried out. And finally, the control of the aggregate can be generated or adapted.

A second possibility is to record the passenger compartment noises and the noises of the at least one aggregate with the aid of sensor technology. The noises or the signals or variables describing them can then be put into relationship with one another. Depending on whether the noise(s) emitted by the aggregates is/are overridden or masked by the passenger compartment noises, the aggregates() can then likewise be appropriately controlled.

A further possibility is to record only the passenger compartment noise, and to compare this with databases with respect to passenger compartment noise having no disturbing noises. In this case, the database includes a plurality of background noises in the passenger compartment which are activated, on the one hand by the current passenger compartment noise and/or, on the other hand, by the information on whether and how passenger compartment elements such as audio devices or a vehicle PC are being operated. If the background noise is identified from the database, the disturbing noises can be filtered out. These can then be assigned to the aggregate or aggregates and reduced by targeted control.

In addition to the possibilities mentioned, the use of a learning system is available. Starting from preproduced databases, these are constantly revised, during the entire life cycle of the vehicle, or they are reconfigured. Thereby, when the vehicle is used by a limited group of persons, a control of the aggregates emitting noise is created that is adjusted to the individual background noise.

Figure 4A:
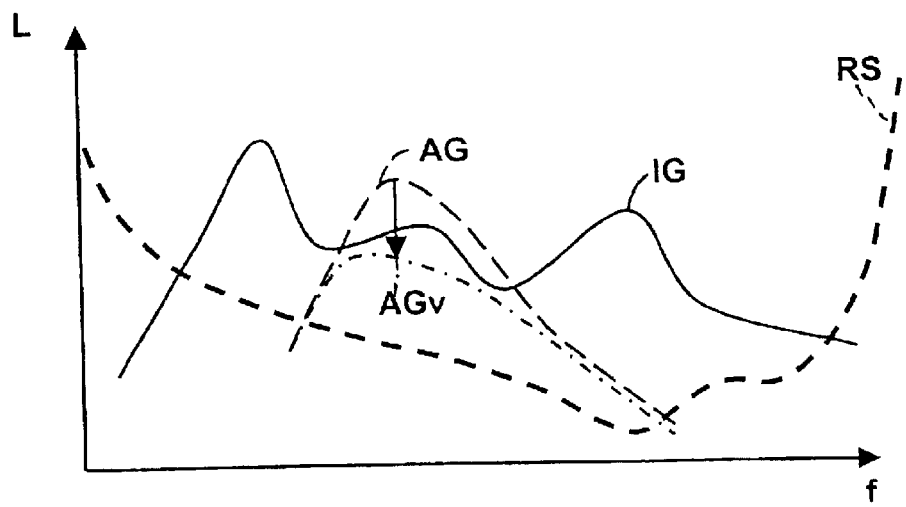
Figure 4B:
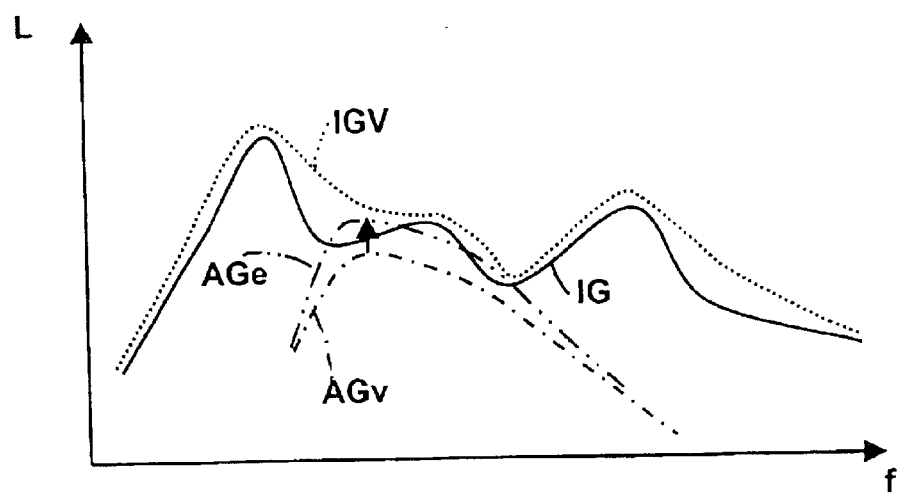

In FIG. 4, which consists of FIGS. 4a and 4b, the matter just described, relative to the overriding, is once more illustrated schematically. Here, noise level L, for instance the sound level or the sound intensity level is plotted against frequency f. A further improvement of the method and the device, respectively, can be achieved if overriding curves as shown schematically in FIG. 4b are used with the added use of psychoacoustic effects. The psychoacoustic method of loudness calculation is suitable for ascertaining -overriding curves. In this connection, for example, specific loudnesses and their overriding curves can be ascertained that are comparable to overriding curve IGV in FIG. 4b. These considerations are assumed below when possible or necessary.

In this spectral illustration as in FIG. 4, RS schematically illustrates an auditory threshold at rest. Here, IG shows, for example, a plot of a passenger compartment's noise level against frequency f. This can be composed, for example, of tone signals, such as music, which delivers, as is known from the related art, a relatively broadband overriding. To this is added the level information, e.g. of the loudness level of the music, of the individual frequency ranges. In a similar manner, IG can include a conversation between two or more persons. Further noises delivering a proportion to IG are, for instance, environmental noises and/or operating noises of the vehicle which, at least proportionally, penetrate the passenger compartment. These can be, for example, wheel rolling noises, noises caused by wind blast, outer influences, such as noises from a construction site or the like, as well as operating noises of the main drive train in the vehicle.

In FIG. 4a, in this connection, the operating noise of an aggregate is labeled AG. One can immediately recognize that aggregate noise AG is not overridden by passenger compartment noise IG or, when looking at levels, is not overlapped. Thereupon the aggregate, naturally under consideration of safety in the case of safety-relevant aggregates, is controlled so that noise development is reduced from AG to AGv. The diminished noise development of the aggregate AGv is then overridden by passenger compartment noise IG, and is no longer perceived as disturbing. As mentioned before, this can occur either by switching off the aggregate, or by controlling at diminished performance or functional volume. A further possibility is avoiding resonance excitations, which likewise lead to increased noise emission, by changing the control frequency or the pulse/pause ratio, respectively. As mentioned before, aside from considering levels, a further improvement can be achieved if, by previously named measures, the overriding, that is, the psychoacoustical additional effects, as, for example, in the loudness are considered. For this purpose, FIG. 4b shows passenger compartment noise IG and aggregate noise AG, this time already diminished as AGv. Furthermore, an overriding curve with regard to passenger compartment noise IGV is drawn in. At this point, reference is made once more to the introductory considerations to FIG. 4. It can be recognized that, under consideration of additional effects, from which overriding curve IGV can be ascertained, there is the possibility of raising, for example AGv into the overriding range (AGe). Thereby, for example, controlling the aggregate with higher performance is possible than by considering only level. Because of that, the aggregate then emits noise AGe, for example.

The considerations and methods or method steps employed for one aggregate can, of course, be used equally for several aggregates, whether these are separately recorded with respect to noise, or a summated noise of several or all aggregates is used as a basis.

Figure 5:
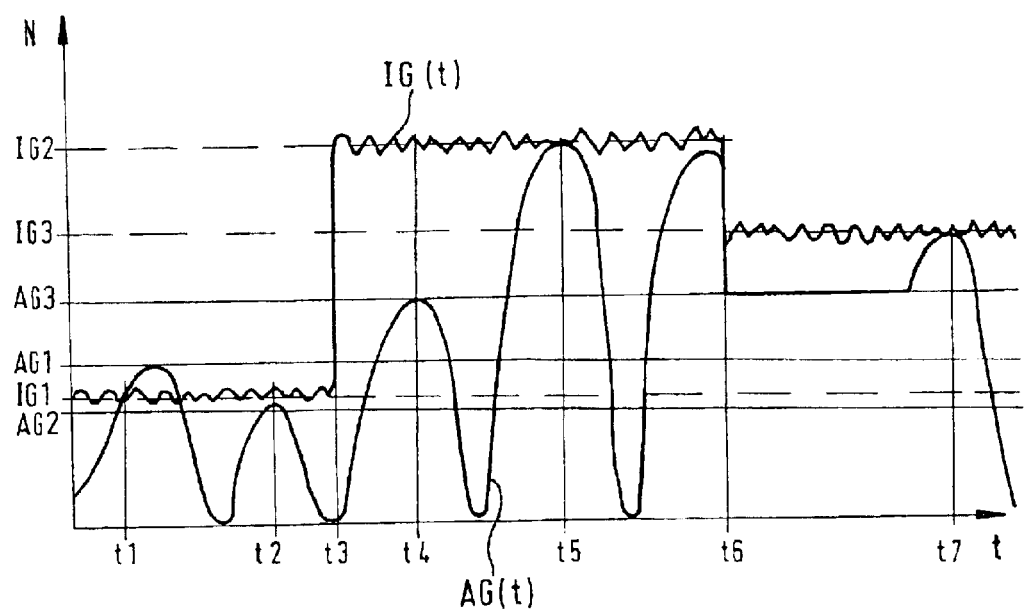
FIG. 5 describes a chronological sequence of passenger compartment noise and aggregate noise under control according to the present invention. Finally FIG. 6, consisting of FIGS. 6a, 6b, 6c and 6d shows various possibilities of a device, according to the present invention, for carrying out the method steps.

In FIG. 5 shows loudness N of the passenger compartment noise, against time t, level L, as shown in previous considerations, being also possible; IG(t) being shown as a broken line. In this connection, loudness, for example, has already been normalized for steady-state noises, and takes overriding into consideration. At point in time t3, the normal loudness value of the passenger compartment noise of, for instance, IG1 brought on by driving noises and/or, for example, conversational noises of the passengers, is increased to IG2 by switching on a passenger compartment element, such as an audio device. AG(t) illustrates, for example, a periodic noise development. At point in time t3, a crossing over of the passenger compartment overriding curve or of loudness IG1 and/or of the noise level is determined. For safety reasons, for example, the noise of the aggregate at time t1 cannot be pushed at once below the value IG1. At the next control, if safety considerations permit, the aggregate is now controlled in such a way that the noise created thereby comes to lie below the passenger compartment noise overriding curve, and thus below loudness IG1, at time t2. At time t3 the increase to the value IG2 is ascertained. Because of that, at time t4 the aggregate can be controlled with the power allowed for and the noise emission created thereby. The next control can then even be increased to the extent that a noise (AG4) is created which still lies below noise value IG2. By the reduction of noise IG2, e.g. by reducing the volume of, for instance, the audio device at time t6, noise AG4 would again be clearly audible in the passenger compartment. Therefore, upon recognition of these noise relationships, control of the aggregates is reduced in such a way that the noise also goes down faster from AG4. For this, for example, a lower background noise, AG3 again, for example, can subsequently be kept up for a longer time. The renewed increase in noise takes place at time t7, up to a loudness of IG3.

FIG. 6 now shows the use of various modules or aggregates for carrying out the method. FIG. 6a shows the passenger compartment sensor technology in block 600. Block 601 represents a signal processing aggregate. In the simplest case, this can be, for instance, an AD converter or it can be a more costly processing, for example, in an automobile radio, a navigation device, a vehicle PC or a communication system. So this aggregate represents passenger compartment element 607, when the passenger compartment sensor technology has already been integrated in processing aggregate 601. Thus, method steps 301, 302 and possibly also 303, depending on the specific embodiment, are carried out by passenger compartment element 607. However, the override analysis in block 303 can just as well be carried out in-control unit 604 of the aggregate. As described above in the method, aggregate sensor technology 605 can optionally be used to record the noise data of the aggregate to be controlled.

Noise regulation can be carried out by the illustrated elements 600, 601 or 607, as well as 604 and 606, and optionally 605. Since by the use of the databases described above, possibly also fuzzy conditions can be created, a fuzzy controller may be used, for example, for the control. The feedback of the control thus takes place by the noises recorded depending on each specific embodiment, that is, either passenger compartment noise and/or aggregate noise.

Figure 6A:
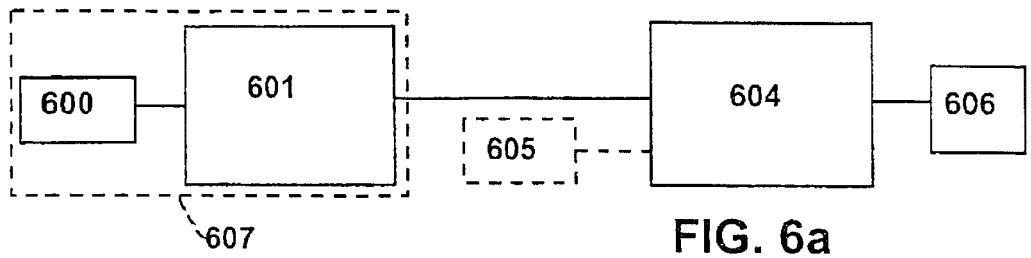
Figure 6B:
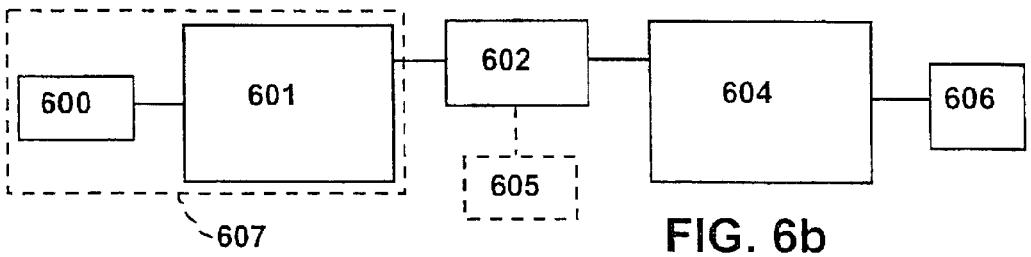

In FIG. 6b, for instance in the case of retrofitting an existing system, additional aggregate 602 is fitted into this arrangement. This may include method steps 303, 304 and 305, and only emits to the control unit of aggregate 604 the signals necessary for the adaptation and/or formation of the control signal. Optional aggregate sensor technology 605 is then connected to additional device 602. However, if the overriding analysis according to method step 303 can indeed be carried out in passenger compartment element 907, the additional aggregate processes only method steps 304 and 305.

Figure 6C:
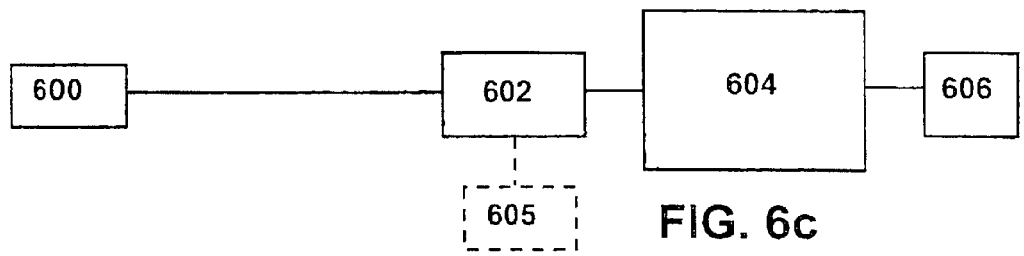

If no such passenger compartment element 607, having the appropriate performance, is present, as illustrated in FIG. 6c, only a combination of passenger compartment sensor technology 600 and additional aggregate 602 can be inserted. In this connection, an intelligent passenger compartment sensor technology could here also execute the preprocessing according to method step 302. FIG. 6c opens the possibility of adding to an existing system made up of control unit 604 and aggregate 606 the noise-regulated control with the aid of passenger compartment sensor technology 600 and additional aggregate 602. In this case too, additional aggregate 602 gives out data for adapting and/or generating control signals for aggregate 606 to control unit 604.

Figure 6D:
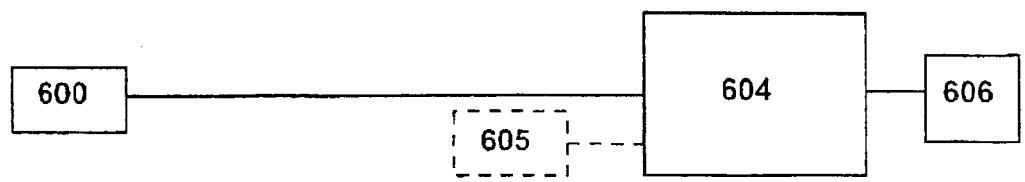

Finally, FIG. 6d offers the possibility in which passenger compartment sensor technology 600 and, optionally, aggregate sensor technology 603 are directly connected to control unit 604. Thus, the entire method, for example, if already known in the case of first equipment, can be processed by the aggregate's control unit 604 on the basis of the recorded noise signals.

FIG. 6, made up of FIGS. 6a, 6b, 6c and 6d shows that, depending on the described elements being present, the method steps can be executed in different elements. Because of that, functionalities with regard to noise-dependent control that already exist in the vehicle can be used, since, for example, microphones are available for voice inputs, as well as digital signal processors for signal processing and similar systems.

What is claimed is:

1. A method for controlling at least one aggregate in a vehicle, comprising the steps of:
   ascertaining at least one of noise caused by the aggregate and at least one variable representing the noise caused by the aggregate;
   ascertaining at least one of noise in a passenger compartment of the vehicle and at least one variable representing the noise in the passenger compartment of the vehicle;
   correlating the at least one of the noise caused by the aggregate and the at least one variable representing the noise caused by the aggregate with the at least one of the noise in the passenger compartment and the at least one variable representing the noise in the passenger compartment; and
   one of generating and adapting a control signal for the aggregate as a function of the correlation so that the noise caused by the aggregate is one of overridden and partially overridden by the noise in the passenger compartment.

2. The method according to claim 1, further comprising the step of comparing the at least one of the noise caused by the aggregate and the at least one variable representing the noise caused by the aggregate to the at least one of the noise in the passenger compartment and the at least one variable representing the noise in the passenger compartment, and the control signal is one of generated and adapted in the one of the generating and the adapting step as a function of the comparison.

3. The method according to claim 1, wherein each of the noise caused by the aggregate and the noise in the passenger compartment are represented by a sound variable.

4. The method according to claim 1, wherein the at least one of the noise in the passenger compartment and the at least one variable representing the noise in the passenger compartment at least proportionally includes at least one of environmental noises with respect to the vehicle, operating noises of the vehicle, at least one variable representing the environmental noises with respect to the vehicle and at least one variable representing the operating noises of the vehicle.

5. The method according to claim 1, further comprising the steps of:
   one of ascertaining and reading out from a database one of spectral and temporal data on the noise caused by the aggregate and the noise in the passenger compartment; and
   correlating the respective one of spectral and temporal data on the noises.

6. The method according to claim 5, further comprising the step of generating the one of the spectral and temporal data as noise level of the noise caused by the aggregate and of the passenger compartment noise as a function of one of frequency and time.

7. The method according to claim 1, wherein the at least one aggregate includes a pump motor.

8. A device, comprising:
   a control unit configured to control at least one aggregate in a vehicle, the control unit including a first arrangement configured to ascertain at least one of noise caused by the aggregate and at least one variable representing the noise caused by the aggregate, a second arrangement configured to ascertain at least one of noise in a passenger compartment of the vehicle and at least one variable representing the noise in the passenger compartment of the vehicle, and a third arrangement configured to correlate the at least one of the noise caused by the aggregate and the at least one variable representing the noise caused by the aggregate with the at least one of the noise in the passenger compartment and the at least one variable representing the noise in the passenger compartment, wherein a control signal for the aggregate one of generated and adapted so that the noise caused by the aggregate is one of overridden and partially overridden by the noise in the passenger compartment.

9. The device according to claim 8, wherein the at least one of the noise in the passenger compartment and the at least one variable representing the noise in the passenger compartment at least proportionally includes at least one of environmental noises with respect to the vehicle, operating noises of the vehicle, at least one variable representing the environmental noises with respect to the vehicle and at least one variable representing the operating noises of the vehicle.

10. The device according to claim 8, wherein the at least one aggregate includes a pump motor.

11. A control unit for one of generating and adapting a control signal for at least one aggregate, wherein the control unit one of is connected to and includes a first arrangement configured to ascertain at least one of noise caused by the aggregate and at least one variable representing the noise caused by the aggregate, and the control unit one of is connected to and includes a second arrangement configured to ascertain at least one of noise in a passenger compartment of the vehicle and at least one variable representing the noise in the passenger compartment of the vehicle, and the control unit one of is connected to and includes a third arrangement configured to correlate the at least one of the noise caused by the aggregate and the at least one variable representing the noise caused by the aggregate with the at least one of the noise in the passenger compartment and the at least one variable representing the noise in the passenger compartment, the control unit one configured to one of generate and adapt the control signal for the aggregate as a function of the correlation so that the noise caused by the aggregate is one of overridden and partially overridden by the noise in the passenger compartment.

12. The control unit according to claim 11, wherein the at least one of the noise in the passenger compartment and the at least one variable representing the noise in the passenger compartment at least proportionally includes at least one of environmental noises with respect to the vehicle, at least one variable representing the environmental noises with respect to the vehicle and at least one variable representing the operating noises of the vehicle.

13. The control unit according to claim 11, wherein the at least one aggregate includes a pump motor.

* * * * *

UNITED STATES PATENT AND TRADEMARK OFFICE
CERTIFICATE OF CORRECTION

| | |
|---|---|
| PATENT NO. | : 6,783,195 B1 |
| APPLICATION NO. | : 10/048421 |
| DATED | : August 31, 2004 |
| INVENTOR(S) | : Han-Peter Grabsch |

It is certified that error appears in the above-identified patent and that said Letters Patent is hereby corrected as shown below:

On the face of the patent, # (57) Abstract, line 1, change "A method and a device as a control unit for" to -- A method, a device, and a control unit are for --

On the face of the patent, # (57) Abstract, line 4, change "In this connection, the" to -- The --

On the face of the patent, # (57) Abstract, line 9, change "Finally, as a function" to -- As a function --

Column 1, line 6, change "BACKGROUND INFORMATION" to -- FIELD OF THE INVENTION --

Column 1, lines 8-9, change "in a vehicle, according to...claims." to -- in a vehicle. --

Column 1, line 10, insert heading -- BACKGROUND INFORMATION --

Column 1, line 12, change "noises which," to -- noises that, --

Column 1, line 17, change "To do this, in DE 195 48 248 A1" to -- In German Published Patent Application No. 195 48 248, --

Column 1, line 19, change "In this instance, hydraulic flood" to -- Hydraulic fluid --

Column 1, line 31, change "DE 44 29 373 A1 shows" to -- German Published Patent Application No. 49 29 373 describes --

Column 1, line 34, change "which is also carried out" to -- which is also performed --

Column 1, line 35, change "minimizing the noises" to -- minimizing noises --

Column 1, line 41, change "valve lying above" to -- valve being above --

Column 1, line 43, change "Here too, a complex method" to -- A complex method is described. --

Column 1, line 44, change "is shown." to -- is described. --

Column 1, line 46, change "is shown in DE 199 08 992 A1. In this document" to -- is described in German Published Patent Application No. 199 08 992, in which, --

UNITED STATES PATENT AND TRADEMARK OFFICE
CERTIFICATE OF CORRECTION

PATENT NO.         : 6,783,195 B1
APPLICATION NO.    : 10/048421
DATED              : August 31, 2004
INVENTOR(S)        : Han-Peter Grabsch It is certified that error appears in the above-identified patent and that said Letters Patent is hereby corrected as shown below:

Column 1, line 51, change "control element which ascertains" to -- control element that ascertains --

Column 1, lines 55-56, change "Here too, a very costly method" to -- A very costly method --

Column 1, line 58, change "It has been shown that the cited related art is not able to" to -- The foregoing is not able to --

Column 1, line 59, change "Thus, in spite of" to -- Thus, despite --

Column 1, line 62, change "And so, a" to -- Thus, a --

Column 1, lines 66-67, change "cannot be avoided in the related art." to -- cannot be avoided. --

Column 2, line 4, change "by the related art" to -- by the foregoing --

Column 2, line 8, change "As examples for this, the technical books" to -- The technical books --

Column 2, line 10, change "are named" to -- are examples --

Column 2, line 11, change "in these books." to -- in those books. --

Column 2, line 12, change "Summary of the Invention" to -- Summary --

Column 2, line 14, change "Consequently, the object is set of expediently letting" to -- An object of the present invention is to let --

Column 2, line 16, change "cannot deliberately influence," to -- may not deliberately influence, --

Column 2, line 20, change "can likewise proportionally" to -- may likewise proportionally --

Column 2, line 22, change "other noises, like" to -- other noises, e.g., --

Column 2, line 25, change "systems or audio components," to -- systems, audio components, --

UNITED STATES PATENT AND TRADEMARK OFFICE
CERTIFICATE OF CORRECTION

PATENT NO. : 6,783,195 B1
APPLICATION NO. : 10/048421
DATED : August 31, 2004
INVENTOR(S) : Han-Peter Grabsch It is certified that error appears in the above-identified patent and that said Letters Patent is hereby corrected as shown below:

Column 2, line 26, change "The device" to -- An example embodiment of a device --

Column 2, lines 26-27, change "as well as the control unit" to -- as well as an example embodiment of a control unit --

Column 2, line 29, change "have the advantage" to -- provides the advantage --

Column 2, line 34, change "can frequently be avoided" to -- may frequently be avoided --

Column 2, line 36, delete "expediently"

Column 2, line 38, change "can be overridden" to -- may be overridden --

Column 2, line 39, change "the already present, generally desirable" to -- the already present and generally desirable --

Column 2, line 41, change "aggregates can be operated" to -- aggregates may be operated --

Column 2, line 43, change "perceptible," to -- perceptible --

Column 2, lines 44-45, change "cannot be overridden" to -- may not be overridden --

Column 2, line 45, change "and performance can" to -- and performance may --

Column 2, line 47, change "Thereby advantageously, the aggregate" to -- The aggregate --

Column 2, line 53, change "Expediently, the correlation is designed" to -- The correlation may be configured --

Column 2, lines 54-55, change "representing them, as the case may be." to -- representing them. --

Column 2, line 55, delete "advantageously"

Column 2, line 57, change "are then used." to -- are used. --

Column 2, line 58, change "In this connection, in order expediently" to -- In order --

UNITED STATES PATENT AND TRADEMARK OFFICE
CERTIFICATE OF CORRECTION

PATENT NO.          : 6,783,195 B1
APPLICATION NO. : 10/048421
DATED                   : August 31, 2004
INVENTOR(S)         : Han-Peter Grabsch It is certified that error appears in the above-identified patent and that said Letters Patent is hereby corrected as shown below:

Column 2, lines 61-62, change "these are then advantageously correlated." to -- these may be correlated. --

Column 2, line 62, change "One can thereby use," to -- One may thereby use --

Column 2, lines 63-64, change "and/or possibly also pre-overriding" to -- and/or pre-overriding --

Column 2, line 66, change "Advantageously, the passenger" to -- The passenger --

Column 3, line 1, change "are represented" to -- may be represented --

Column 3, lines 1-2, change "for instance sound pressure" to -- for example, sound pressure --

Column 3, line 3, delete "here"

Column 3, line 4, delete "expedient"

Column 3, line 7, change "Besides that, reduction" to -- Reduction --

Column 3, line 8, change "components contributes advantageously" to --components may contribute --

Column 3, line 10, change "can at least" to -- may at least --

Column 3, line 11, change "It is of further advantage, also perhaps for reasons" to -- For reasons --

Column 3, line 12, delete "pressure"

Column 3, line 12, change "requirements, that noise-wise" to -- requirements, for example, noise-wise --

Column 3, line 13, change "can be operated" to -- may be operated --

Column 3, lines 15-16, delete "Still more...the specification"

UNITED STATES PATENT AND TRADEMARK OFFICE
CERTIFICATE OF CORRECTION

| | |
|---|---|
| PATENT NO. | : 6,783,195 B1 |
| APPLICATION NO. | : 10/048421 |
| DATED | : August 31, 2004 |
| INVENTOR(S) | : Han-Peter Grabsch |

It is certified that error appears in the above-identified patent and that said Letters Patent is hereby corrected as shown below:

Column 3, lines 18-35, replace with the following:

-- BRIEF DESCRIPTION OF THE DRAWINGS

Figure 1 illustrates a conventional braking system of the general kind, in which various aggregates are controlled.

Figure 2, starting from a drive system, illustrates a plurality of aggregates connected with it but separately controlled.

Figure 3 is a flow diagram illustrating an example embodiment of a method according to the present invention for controlling at least one aggregate.

Figure 4a is a graph schematically illustrating the overriding of aggregate noises.

Figure 4b is another graph schematically illustrating the overriding of aggregate noises.

Figure 5 is a graph illustrating a chronological sequence of passenger compartment noise and aggregate noise under control according to the present invention.

Figure 6a schematically illustrates an example embodiment of a device according to the present invention for performing the method steps.

Figure 6b schematically illustrates another example embodiment of a device according to the present invention for performing the method steps.

Figure 6c schematically illustrates a further example embodiment of a device according to the present invention for performing the method steps.

Figure 6d schematically illustrates still another example embodiment of a device according to the present invention for performing the method steps. --

Column 3, lines 37-38, change "DESCRIPTION...EMBODIMENT" to -- DETAILED DESCRIPTION --

Column 3, line 39, change "FIG. 1 shows especially an" to -- FIG. 1 illustrates for example, an --

Column 3, line 43, change "using a means" to -- using an arrangement --

UNITED STATES PATENT AND TRADEMARK OFFICE
CERTIFICATE OF CORRECTION

| | |
|---|---|
| PATENT NO. | : 6,783,195 B1 |
| APPLICATION NO. | : 10/048421 |
| DATED | : August 31, 2004 |
| INVENTOR(S) | : Han-Peter Grabsch |

It is certified that error appears in the above-identified patent and that said Letters Patent is hereby corrected as shown below:

Column 3, line 44, change "pressure mediun," to -- pressure medium, --

Column 3, line 45, change "should take place" to -- may occur --

Column 3, line 47, change "braking system shown" to -- braking system illustrated --

Column 3, lines 47-48, delete "is illustrated which"

Column 3, line 49, change "pressure can be" to -- pressure may be --

Column 3, line 54, change "includes valve means" to -- includes a valve arrangement --

Column 3, lines 56-57, change "components known from the related art," to -- components, --

Column 3, line 57, change "the specific embodiment" to -- the specific example embodiment --

Column 3, line 59, change "the means for conveying" to -- the arrangement for conveying --

Column 3, line 62, change "is shown as 105." to -- is indicated as 105. --

Column 3, line 62, delete "exemplary"

Column 3, line 65, change "As an example," to -- For example --

Column 3, line 66, change "system, here" to -- system, --

Column 4, line 1, change "valve means...have been" to -- valve arrangements...are --

Column 4, line 2, delete "reasons of"

Column 4, line 6, change "especially the motor/pump unit," to -- for example, the motor/pump unit, --

Column 4, line 9, change "are shown schematically" to -- are illustrated schematically --

Column 4, line 13, change "is shown as 109." To -- is indicated as 109. --

UNITED STATES PATENT AND TRADEMARK OFFICE
CERTIFICATE OF CORRECTION

PATENT NO.        : 6,783,195 B1
APPLICATION NO. : 10/048421
DATED             : August 31, 2004
INVENTOR(S)       : Han-Peter Grabsch It is certified that error appears in the above-identified patent and that said Letters Patent is hereby corrected as shown below:

Column 4, line 13, change "Element 110 represents" to -- Element 110 indicates --

Column 4, line 15, change "Control unit 110 can," to -- Control unit 110 may, --

Column 4, line 18, change "invention can also come" to -- invention may also come --

Column 4, line 21, change "variables such" to -- variables, such --

Column 4, line 24, change "noises are recorded" to -- noises may be recorded --

Column 4, line 25, change "data can also be" to -- data may also be --

Column 4, line 29, change "can now be controlled." To -- may be controlled. --

Column 4, lines 29-30, change "To select examples, as mentioned before," to -- For example, --

Column 4, line 31, change "valve means 116," to -- valve arrangement 116, --

Column 4, line 32, change "shown as" to -- illustrated as --

Column 4, line 33, change "In this connection," to -- In this regard, --

Column 4, line 35, change "105 is based, can" to --105 is based, may --

Column 4, line 39, change "intensity, etc); here these are" to -- intensity, etc.). These are --

Column 4, line 40, change "can also be" to -- may also be --

Column 4, line 47, change "which do not" to -- that do not --

Column 4, line 51, change "can be predefined" to -- may be predefined --

Column 4, line 53, change "In FIG. 2, a drive system" to -- "FIG. 2 illustrates a drive system --

Column 4, line 53, change "motor vehicles" to -- motor vehicles, --

Column 4, lines 53-54, delete "can be recognized,"

UNITED STATES PATENT AND TRADEMARK OFFICE
CERTIFICATE OF CORRECTION

PATENT NO. : 6,783,195 B1
APPLICATION NO. : 10/048421
DATED : August 31, 2004
INVENTOR(S) : Han-Peter Grabsch It is certified that error appears in the above-identified patent and that said Letters Patent is hereby corrected as shown below:

Column 4, line 61, change "216 whose output shaft" to -- 216, the output shaft of which --

Column 5, line 3, change "system which works" to -- system which operates --

Column 5, line 4, change "and perhaps when" to -- and possibly when --

Column 5, line 9, delete "here"

Column 5, line 10, change "whose power output is," to -- the power output of which is, --

Column 5, line 27, change "could be provided as 200," to -- may be provided as indicated 200 --

Column 5, line 27, delete "already"

Column 5, line 29, change "200 could also" to -- 200 may also --

Column 5, line 36, change "In the following, the operating manner" to -- The operating manner --

Column 5, line 37, delete "now"

Column 5, line 39, change "mentioned above," to -- described above, --

Column 5, line 39, change "218 can be" to -- 218 may be --

Column 5, line 44, delete "above mentioned"

Column 5, line 44, change "aggregates can" to -- aggregates may --

Column 5, line 47, change "current can not" to -- current may not --

Column 5, line 48, change "can be produced" to -- may be produced --

Column 5, line 51, change "these aggregates shown" to -- these aggregates illustrated --

Column 5, line 51, change "1 and 2 give off" to -- 1 and 2 emit --

UNITED STATES PATENT AND TRADEMARK OFFICE
CERTIFICATE OF CORRECTION

PATENT NO. : 6,783,195 B1
APPLICATION NO. : 10/048421
DATED : August 31, 2004
INVENTOR(S) : Han-Peter Grabsch It is certified that error appears in the above-identified patent and that said Letters Patent is hereby corrected as shown below:

Column 5, line 53, change "Above all, the aggregates" to -- The aggregates --

Column 5, line 55, change "As shown, the aggregates can be" to -- As illustrated, the aggregates may be --

Column 5, line 58, change "special noises which" to -- special noises that --

Column 5, line 60, change "can be controlled" to -- may be controlled --

Column 5, line 61, change "a way that" to -- a manner that --

Column 5, line 61, delete "preferably"

Column 5, line 61, change "are-overridden" to -- are overridden --

Column 6, line 2, change "can at least" to -- may at least --

Column 6, line 4, change "depending on the design" to -- depending on the configuration --

Column 6, line 5, change "above-named components" to -- above-described components --

Column 6, line 7, change "FIG. 3 shows generally a method" to -- FIG. 3 is a flow diagram illustrating an example embodiment of a method according to the present invention --

Column 6, line 8, change "As mentioned before," to -- As described above, --

Column 6, line 11, change "cannot deliberately influence" to -- may not deliberately influence --

Column 6, line 12, change "should expediently occur" to -- may occur --

Column 6, line 15, change "such a way" to -- such a manner --

Column 6, line 17, changed "method takes place in" to -- method occurs in --

Column 6, line 23, change "can later be" to -- may later be --

UNITED STATES PATENT AND TRADEMARK OFFICE
CERTIFICATE OF CORRECTION

PATENT NO. : 6,783,195 B1
APPLICATION NO. : 10/048421
DATED : August 31, 2004
INVENTOR(S) : Han-Peter Grabsch It is certified that error appears in the above-identified patent and that said Letters Patent is hereby corrected as shown below:

Column 6, line 25, change "can be used," to -- may be used, --

Column 6, line 32, change "noise sensors, can" to -- noise sensors, may --

Column 6, line 35, change "can be recorded" to -- may be recorded --

Column 6, line 38, change "a specific" to -- an example --

Column 6, line 38, change "embodiment, yet to be explained, of" to --embodiment of --

Column 6, line 39, delete "introduced"

Column 6, line 45, change "by a aggregate" to -- by an aggregate --

Column 6, line 48, change "the noise can" to -- the noise may --

Column 6, line 50, change "(e.g. air density" to -- (e.g., air density --

Column 6, line 52, delete "previously named"

Column 6, line 55, change "This happens," to -- This occurs, --

Column 6, line 57, change "carried out in block 302." To -- performed in block 302. --

Column 6, line 58, change "can consist in" to -- may consist in --

Column 7, line 2, delete "in particular,"

Column 7, line 4, change "can be ascertained," to -- may be ascertained, --

Column 7, line 7, change "(e.g. With noises whose" to -- (e.g., with noises --

Column 7, line 8, change "time of appearance or frequency" to -- the time of appearance or frequency of which --

Column 7, line 9, change "can be" to -- may be --

Column 7, line 10, change "purpose, in particular" to -- purpose, for example, --

Column 7, lines 13-14, change "specific embodiment" to -- specific configuration --

UNITED STATES PATENT AND TRADEMARK OFFICE
CERTIFICATE OF CORRECTION

PATENT NO. : 6,783,195 B1
APPLICATION NO. : 10/048421
DATED : August 31, 2004
INVENTOR(S) : Han-Peter Grabsch It is certified that error appears in the above-identified patent and that said Letters Patent is hereby corrected as shown below:

Column 7, line 16, change "for instance," to -- for example, --

Column 7, line 17, change "Besides that," to -- Also, --

Column 7, line 19, change "can also be" to -- may also be --

Column 7, line 23, change "can be used" to -- may be used --

Column 7, line 29, delete "then"

Column 7, line 31, change "can already be" to -- may already be --

Column 7, line 34, change "aggregate can be," to -- aggregate may be, --

Column 7, line 35, change "for instance," to -- for example, --

Column 7, line 36, change "It can" to -- It may --

Column 7, line 38, change "engine in FIG. 2," to -- engine illustrated in FIG. 2, --

Column 7, line 38, change "it can be" to -- it may be --

Column 7, line 39, change "already mentioned." to -- described above. --

Column 7, line 41, change "can be predefined." to -- may be predefined. --

Column 7, line 48, change "system can play" to -- system may play --

Column 7, line 49, change "can steadily run" to -- may steadily run --

Column 7, line 50, change "can be switched" to -- may be switched --

Column 7, line 52, change "also conceivable" to -- also possible --

Column 7, line 54, change "As has already been indicated," to -- As previously indicated, --

Column 7, lines 54-55, change "various specific embodiments" to -- various example embodiments --

UNITED STATES PATENT AND TRADEMARK OFFICE
CERTIFICATE OF CORRECTION

| | |
|---|---|
| PATENT NO. | : 6,783,195 B1 |
| APPLICATION NO. | : 10/048421 |
| DATED | : August 31, 2004 |
| INVENTOR(S) | : Han-Peter Grabsch |

It is certified that error appears in the above-identified patent and that said Letters Patent is hereby corrected as shown below:

Column 7, line 59, change "can be ascertained" to -- may be ascertained --

Column 7, line 60, delete "especially"

Column 7, line 64, change "carried out." to -- performed. --

Column 7, lines 64-65, change "already mentioned" to -- previously described --

Column 8, line 1, change "can be carried out." to -- may be performed. --

Column 8, line 1, change "And finally, the" to -- The --

Column 8, line 2, change "can be generated" to -- may be generated --

Column 8, line 6, change "can then be put" to -- may then be put --

Column 8, line 9, change "can then" to -- may then --

Column 8, line 21, change "noises can be filtered out" to -- may be filtered out. --

Column 8, line 24, change "possibilities mentioned," to -- possibilities described, --

Column 8, line 31, delete "FIG. 4 which consists of"

Column 8, line 32, change "the overriding," to -- the overriding --

Column 8, line 32, delete "once more"

Column 8, line 33, change "Here, noise level L, for instance," to -- Noise level L, for example, --

Column 8, line 36, change "can be achieved" to -- may be achieved --

Column 8, line 37, change "shown schematically" to -- illustrated schematically --

Column 8, line 41, change "can be ascertained" to -- may be ascertained --

Column 8, line 42, change "curve IGV in FIG. 4*b*." to -- curve IGV illustrated in FIG. 4*b*. --

UNITED STATES PATENT AND TRADEMARK OFFICE
CERTIFICATE OF CORRECTION

| | | |
|---|---|---|
| PATENT NO. | : 6,783,195 B1 | |
| APPLICATION NO. | : 10/048421 | |
| DATED | : August 31, 2004 | |
| INVENTOR(S) | : Han-Peter Grabsch | |

It is certified that error appears in the above-identified patent and that said Letters Patent is hereby corrected as shown below:

Column 8, line 46, change "as in FIG. 4," to -- as illustrated in FIG. 4, --

Column 8, line 47, delete "Here,"

Column 8, line 47, change "IG shows," to -- IG illustrates, --

Column 8, line 49, change "This can be" to -- This may be --

Column 8, lines 50-51, change "as is known from the related art," to -- as is conventional --

Column 8, line 52, change "e.g." to -- e.g., --

Column 8, line 54, change "IG can include" to -- IG may include --

Column 8, lines 55-56, change "for instance," to -- for example, --

Column 8, line 58, change "These can be," to -- These may be --

Column 8, line 60, change "construction site or the like" to -- construction site, etc., --

Column 8, line 62, change "In FIG. 4*a*," to -- As illustrated in FIG. 4*a*, --

Column 8, line 63, change "One can" to -- One may --

Column 8, line 66, change "Thereupon the aggregate," to -- Thereupon, the aggregate, --

Column 9, lines 4-5, change "As mentioned before," to -- As described above, --

Column 9, lines 4-5, change "As mentioned before," to -- As described above, --

Column 9, line 5, change "this can occur" to -- this may occur --

Column 9, lines 5, change "the aggregate," to -- the aggregate --

Column 9, line 10, change "As mentioned before," to -- As described above, --

Column 9, line 11, change "can be achieved" to -- may be achieved --

UNITED STATES PATENT AND TRADEMARK OFFICE
CERTIFICATE OF CORRECTION

PATENT NO. : 6,783,195 B1
APPLICATION NO. : 10/048421
DATED : August 31, 2004
INVENTOR(S) : Han-Peter Grabsch It is certified that error appears in the above-identified patent and that said Letters Patent is hereby corrected as shown below:

Column 9, lines 11-12, change "by previously named measures," to -- by above-described measures, --

Column 9, line 14, change "FIG. 4*b* shows" to -- FIG. 4*b* illustrates --

Column 9, line 18, change "draw in." to -- included. --

Column 9, line 19, change "It can be" to -- It may be --

Column 9, line 27, change "can, of course, be used" to -- may be used --

Column 9, line 31, change "In FIG. 5 shows loudness" to -- FIG. 5 illustrates loudness as illustrated in --

Column 9, line 33, delete "being also possible;"

Column 9, line 33, change "being shown as" to -- being illustrated as --

Column 9, lines 37-38, change "for instance," to -- for example, --

Column 9, line 46, change "cannot be pushed" to -- may not be pushed --

Column 9, line 48, change "in such a way" to -- in such a manner --

Column 9, line 49, change "comes to lie" to -- comes to be --

Column 9, line 52, change "the aggregates can" to -- the aggregates may --

Column 9, line 54, change "control can then" to -- control may then --

Column 9, line 54, delete "even"

Column 9, line 56, change "still lies below" to -- still is below --

Column 9, line 57, change "e.g." to -- e.g., --

Column 9, line 57, change "for instance" to -- for example --

Column 9, line 58, change "would again be" to -- may be --

Column 9, line 61, change "such a way" to -- such a manner --

UNITED STATES PATENT AND TRADEMARK OFFICE
CERTIFICATE OF CORRECTION

PATENT NO. : 6,783,195 B1
APPLICATION NO. : 10/048421
DATED : August 31, 2004
INVENTOR(S) : Han-Peter Grabsch It is certified that error appears in the above-identified patent and that said Letters Patent is hereby corrected as shown below:

Column 9, line 63, change "can subsequently be" to -- may subsequently be --

Column 9, line 64, change "takes place at" to -- occurs at --

Column 9, line 66, change "FIG. 6 now shows" to -- FIGS. 6*a* to 6*d* illustrate --

Column 9, line 67, change "for carrying out" to -- for performing --

Column 9, line 67, change "FIG. 6*a* shows" to -- FIG. 6*a* illustrates --

Column 10, line 3, change "this can be, for instance," to -- this may be, for instance, --

Column 10, line 4, change "it can be" to -- it may be --

Column 10, line 4, change "costly processing" to -- costly processing device --

Column 10, line 4, change "for example, in an" to -- for example, a device in an --

Column 10, line 6, change "So this aggregate" to -- This aggregate --

Column 10, line 8, delete "already"

Column 10, line 10, change "the specific embodiment" to -- the specific configuration --

Column 10, line 11, change "are carried out" to -- are performed --

Column 10, line 12, change "can just as well" to -- may just as well --

Column 10, line 13, change "be carried out" to -- be performed --

Column 10, line 15, change "can optionally be used" to -- may optionally be used --

Column 10, line 18, change "can be carried out" to -- may be performed --

Column 10, line 21, change "can be created" to -- may be created --

Column 10, line 23, change "thus takes place" to -- thus occurs--

Column 10, line 24, change "each specific embodiment" to -- each specific configuration --

UNITED STATES PATENT AND TRADEMARK OFFICE
CERTIFICATE OF CORRECTION

PATENT NO.           : 6,783,195 B1
APPLICATION NO. : 10/048421
DATED                    : August 31, 2004
INVENTOR(S)          : Han-Peter Grabsch It is certified that error appears in the above-identified patent and that said Letters Patent is hereby corrected as shown below:

Column 10, line 27, change "In FIG. 6*b*, for instance," to -- As illustrated in FIG. 6*b*, for example, --

Column 10, line 18, change "can be carried out" to -- may be performed --

Column 10, line 33, delete "then"

Column 10, line 34, change "step 303 can indeed" to -- step 303 may --

Column 10, line 35, change "be carried out" to -- be performed --

Column 10, line 38, change "element 607," to -- element 607 --

Column 10, line 41, change "602 can be" to -- 602 may --

Column 10, line 43, change "technology could here" to -- technology may --

Column 10, line 44, change "FIG. 6*a* opens" to -- The example embodiment illustrated in FIG. 6*a* opens --

Column 10, line 48, change "In this case too," to -- In this case, --

Column 10, line 53, delete "Finally,"

Column 10, line 53, change "FIG. 6*d* offers" to -- FIG. 6*d* illustrates --

Column 10, line 57, change "can be processed" to -- may be processed --

Column 10, line 60, change "... and 6*d* show that," to -- ... and 6*d* illustrates that, --

Column 10, line 62, change "steps can be executed" to -- steps may be executed --

Column 10, line 64, delete "already"

UNITED STATES PATENT AND TRADEMARK OFFICE
CERTIFICATE OF CORRECTION

PATENT NO. : 6,783,195 B1
APPLICATION NO. : 10/048421
DATED : August 31, 2004
INVENTOR(S) : Han-Peter Grabsch It is certified that error appears in the above-identified patent and that said Letters Patent is hereby corrected as shown below:

Column 10, line 64, change "can be used" to -- may be used --

Signed and Sealed this

Seventh Day of August, 2007

JON W. DUDAS
*Director of the United States Patent and Trademark Office*